United States Patent [19]
Wilkins

[11] 3,874,173
[45] Apr. 1, 1975

[54] HYDROSTATIC POWER TRANSMISSION SYSTEM

[76] Inventor: Bernard Charles Wilkins, Henshaw Farm, Todmorden, Lancashire, OL146QR, England

[22] Filed: June 4, 1973

[21] Appl. No.: 366,669

[52] U.S. Cl. ............ 60/420, 60/431, 60/452, 60/484, 60/445
[51] Int. Cl. ............................ F15b 18/00
[58] Field of Search ....... 60/19, 413, 416, 420, 431, 60/432, 445, 448, 449, 450, 451, 452, 484

[56] References Cited
UNITED STATES PATENTS

| | | | |
|---|---|---|---|
| 1,711,967 | 5/1929 | Robson | 60/452 X |
| 2,526,835 | 10/1950 | Tucker | 60/452 X |
| 2,944,400 | 7/1960 | Ashton | 60/432 X |
| 3,371,479 | 3/1968 | Yapp et al. | 60/431 |

Primary Examiner—Edgar W. Geoghegan

[57] ABSTRACT

A hydrostatic power transmission system with co-ordinated control of prime mover and pump, supplying any number of rotary and linear hydrostatic motors controlled integrally and by power transformers respectively.

7 Claims, 2 Drawing Figures

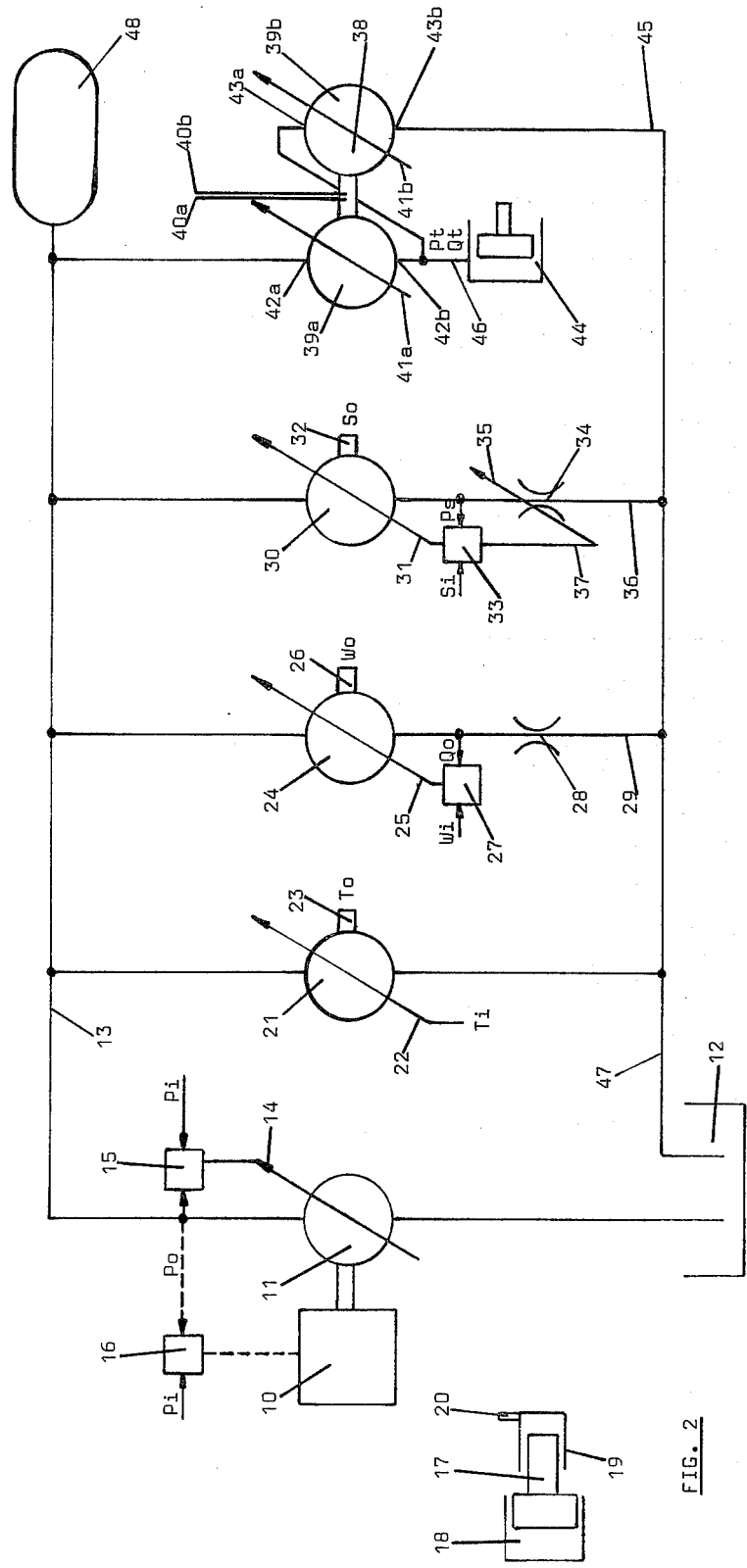

HYDROSTATIC POWER TRANSMISSION SYSTEM

This invention relates to the generation, transmission, and utilisation of power. Hitherto, hydrostatic power transmission, despite many advantages in comparison with electric and mechanical transmissions, has been limited in application by the high cost of the present designs of hydrostatic systems.

It is the object of this invention to provide a power transmission system of reduced cost that will extend the advantages of hydrostatic drives to new fields.

According to this invention a hydrostatic power transmission system comprises one or more reservoirs containing liquid at lower pressure, one or more prime-mover-driven pumps controlled to deliver the liquid from the reservoir or reservoirs at constant higher pressure, two or more linear or rotary hydrostatic motors or groups of motors, independently controlled by feedback mechanisms directly, or via one or more hydrostatic power transformers, a system of interconnected higher pressure conduits to connect the pump or pumps to the motor or motors, and a system of interconnected lower pressure conduits to connect the motor or motors to the lower pressure reservoir or reservoirs.

If energy is consumed by a prime mover, motive power is produced which is generally in a form and location different from that required by the driving elements of a machine or system of machines, and it is necessary to transmit the power produced from the prime mover to the points of utilisation and to transform this power to meet the specific requirements of torque and angular velocity or force and linear velocity of the utilising elements. By employing the prime motive power to drive a pump or pumps which take liquid from a reservoir at lower pressure and deliver liquid into a conduit at higher pressure, the motive power takes the form of a liquid at pressure which can be conveyed in the higher pressure conduit to points of utilisation. At these points hydrostatic motors are able to transform the higher pressure liquid into the required form of motive power by employing feedback controls to vary the displacement, or more precisely, the torque to conduit pressure ratios of the hydrostatic motors, or by employing a hydrostatic power transformer to raise or lower the pressure in the relevant hydrostatic motor above or below the pressure existing in the higher pressure conduit. A lower pressure conduit connects the hydrostatic motors and hydrostatic power transformers to a lower pressure liquid reservoir.

One construction of a hydrostatic power transmission system in accordance with this invention will now be described by way of example only with reference to the accompanying drawings in which FIG. 1 shows in diagrammatic form a hydrostatic power transmission system and FIG. 2 shows in diagrammatic form a section view of part of an alternative prime mover/pump combination.

Referring to the drawing FIG. 1, the system shown is intended to provide motive power for a machine, or groups of machines, not shown. A prime mover 10 running at constant rotational speed drives a variable-displacement pump 11 to pump liquid from a low-pressure reservoir 12 into a high-pressure conduit 13. The pump 11 is fitted with a displacement member 14 which is adjusted by a pressure-sensing servo 15, the output of which is a function of the difference between a pressure $Po$ in the high-pressure conduit 13 and a reference pressure $Pi$. Accordingly, as the demand for liquid increases, pressure $Po$ falls, the displacement of pump 11 and therefore the flow from the reservoir 12 to the high-pressure conduit 13 increase, until the system demand is met and pressure $Po$ re-attained.

Additionally, a pressure-sensing servo 16 can act to vary the speed of the prime mover 10, or start and stop the motion of the prime mover 10, as maintenance of pressure $Po$ requires. The prime mover 10 and the pump 11, as a further alternative, share a common piston member 17 as shown in FIG. 2, to transmit linear motion directly from expanding gases in a cylinder 18 to liquid in a hydraulic cylinder 19. The relative areas of the opposing faces of the piston member 17 are in accordance with the ratio between average working pressure in the cylinder 18 and pressure in a high-pressure conduit 20.

The utilisation of hydrostatic power in the form of a supply of liquid maintained at constant pressure may be achieved in several ways depending upon the power input requirements of the driven machines. Referring back to FIG. 1, a variable-displacement hydrostatic motor 21 with a displacement control 22 and output shaft 23 is required to provide a sensibly constant torque $To$ irrespective of speed. Accordingly the motor displacement control 22 is set to $Ti$ so that, with system pressure $Po$, the required torque $To$ appears at the motor output shaft 23.

A variable-displacement hydrostatic motor 24 with a displacement control 25 and output shaft 26 is required to provide a sensibly constant power output $Wo$. Accordingly the displacement control 25 is automatically controlled by a pressure servo 27. The pressure servo 27 has an output which is a function of the difference between a flow signal $Qo$ and a reference $Wi$. The flow signal $Qo$ is generated by a pressure drop across a constriction 28 in a conduit 29 which is individual to the motor 24. The flow in the conduit 29 is approximately proportional to the power output $Wo$ of the motor 24. Thus, if flow signal $Qo$ maintains a constant relationship to input $Wi$, then output $Wo$ and input $Wi$ will remain correspondingly related.

A variable-displacement hydrostatic motor 30 with a displacement control 31 and output shaft 32 is required to provide a constant speed output $So$. Accordingly, the displacement control 31 is automatically controlled by a pressure servo 33. The pressure servo 33 has an output which is a function of the difference between a pressure signal $Ps$ and a reference input $Si$. The pressure signal $Ps$ is generated by a pressure drop across a variable constriction 34 with a control member 35, the constriction 34 being located in an indivial conduit 36 of the motor 30. The displacement control 31 is coupled by a means 37 to the constriction control 35, in such a way that the displacement of the motor 30 is proportional to the area of the constriction 34. The pressure signal $Ps$ will then maintain a constant relationship with the output speed $So$. Thus, if pressure signal $Ps$ maintains a constant relationship to input $Si$, then $So$ and $Si$ will remain related.

A power transformer 38, comprising a pair of variable-displacement hydrostatic pump/motor units $39a$ and $39b$, with input/output shafts $40a$ and $40b$ mechanically coupled, displacement controls $41a$ and $41b$, and ports $42a$ and $42b$ and $43a$ and $43b$, is required to supply a linear hydrostatic motor 44 with power in any required form, i.e. any pressure or any flow. Accordingly, with the port 42a connected to the high-pressure conduit 13, the port 43b connected to an individual low-pressure conduit 45, the port 43a connected to the port 42b by an output pressure conduit 46, to which also is connected the linear motor 44, automatic actuation of the displacement controls 41a and 41b, in accordance with the required power demands, allows a pressure $P_t$ in conduit 46 to assume any desired value, depending upon the ratio of the displacements of the pump/motor units 39a and 39b. With the requisite ratio the pressure $P_t$ will remain sensibly constant over a range of flow into or out of the linear motor 44, the power transformer shafts 40a and 40b driving one way or the other until equilibrium is maintained. It may be necessary to prevent overspeed by independently controlling the displacement control 41a in a manner similar to that described for the control of the hydrostatic motor 30. If it is required to maintain a constant flow $Q_t$ into or out of the hydrostatic motor 44, irrespective of its pressure requirements, then this may be achieved by setting the displacement control 41b at a value consistent with maximum permitted pressure (for unit 39a at maximum displacement) and controlling the displacement control 41a in accordance with required flow into the hydrostatic motor 44 in a similar manner to that described for motor 24. Constant power operation of the hydrostatic motor 44 can be achieved by setting displacement control 41b to the value necessary for maximum required pressure (for unit 39a at maximum displacement) and controlling displacement control 41a so as to maintain constant flow into port 42a.

The individual low-pressure conduits such as 29, 36, and 45, may be connected directly to the reservoir 12, or via a common low-pressure conduit 47.

To cater for rapid variations in demand for flow, a liquid accumulator (or accumulators) 48 may be connected into the high-pressure conduit 13 (as shown in FIG. 1), or the low-pressure conduit 47, or at any point in the system that flow conditions require.

For the sake of simplicity various components such as relief valves, coolers, filters, etc. have not been shown in the drawings FIG. 1 and FIG. 2, nor mentioned in the description, but it is hereby stated that such elements as are normally necessary in existing current practice, are to be presumed to be incorporated.

By employing the above principles of power distribution and control, combining them, and by employing other known methods of control individually and in combination, it will become evident to practitioners that almost any type of machine drive, rotary or linear, can be effected whether the original power source is in the form of a fuel or in the form of electricity.

What I claim is:

1. A hydrostatic power transmission system comprising in combination a reservoir containing liquid at low pressure, a prime-mover-driven pump controlled to deliver the liquid from the reservoir at sensibly constant higher pressure, a plurality of independent rotary variable-displacement hydrostatic motors controlled by integral feedback mechanisms, any number of independent linear hydrostatic motors controlled by power transformers, interconnected high-pressure conduits connecting said pump to said motors and said power transformers, and interconnected low-pressure conduits connecting said motors and said power transformers to said reservoir.

2. The hydrostatic power transmission system as defined in claim 1, in which the prime-mover-driven pump is characterised by an expanding gas cylinder, a common piston member, and a hydraulic cylinder, so combined that the linear motion of the prime mover is transmitted directly to the liquid in the hydraulic cylinder.

3. The hydrostatic power transmission system as defined in claim 1, in which a pressure-sensing servo system acts upon the pump and the prime mover to start and stop motion of the prime mover and to vary prime mover speed and pump displacement in any desired relationship.

4. The hydrostatic power transmission system as defined in claim 1, in which at least one hydrostatic power transformer comprises in combination a pair of variable-displacement hydrostatic pump/motor units, each with two liquid ports and one shaft, so arranged that one port of one pump/motor unit is connected to a higher pressure conduit, and one port of the other pump/motor unit is connected to a lower pressure conduit, the two remaining ports connected to an output pressure conduit, and the shafts mechanically coupled, with the displacement controls automatically actuated to control pressure and flow.

5. The hydrostatic power transmission system as defined in claim 4, in which at least one linear hydrostatic motor is supplied with power in any required form by one of the hydrostatic power transformers.

6. The hydrostatic power transmission system as defined in claim 1, in which at least one variable-displacement hydrostatic motor incorporates pressure-sensing servo means for varying motor displacement, so as to maintain a sensibly constant pressure drop across a constriction in an individual conduit of the motor.

7. The hydrostatic power transmission system as defined in claim 6, in which the constriction is variable in area and coupled to the motor displacement control, so that the displacement of the motor is proportional to the area of the constriction.

* * * * *